United States Patent [19]
Kasai et al.

[11] Patent Number: 5,262,633
[45] Date of Patent: Nov. 16, 1993

[54] WIDEBAND ANTI-REFLECTION COATING FOR INDIUM ANTIMONIDE PHOTODETECTOR DEVICE AND METHOD OF FORMING THE SAME

[75] Inventors: Ichiro Kasai, Solvang; Herbert L. Hettich, Goleta; Stephen L. Lawrence, Santa Barbara; James E. Randolph, San Luis Obispo, all of Calif.

[73] Assignee: Santa Barbara Research Center, Goleta, Calif.

[21] Appl. No.: 934,136

[22] Filed: Aug. 21, 1992

[51] Int. Cl.$^5$ .............................................. H01J 40/14
[52] U.S. Cl. ........................... 250/208.1; 257/437; 359/588; 250/216; 250/226
[58] Field of Search .................... 250/208.1, 216; 257/437, 447, 460; 359/586, 587, 588

[56] References Cited

U.S. PATENT DOCUMENTS

| | | | |
|---|---|---|---|
| 3,463,574 | 8/1969 | Bastein et al. | 359/588 |
| 3,854,796 | 12/1974 | Thelen | 359/588 |
| 4,528,418 | 7/1985 | McGill | 257/437 |

*Primary Examiner*—David C. Nelms
*Assistant Examiner*—K. Shami
*Attorney, Agent, or Firm*—W. C. Schubert; W. K. Denson-Low

[57] ABSTRACT

A four-layer, wideband anti-reflection coating (30) is formed on a light-receiving surface (22) of an indium antimonide (InSb) photodetector (10) to enable detection of light at visible as well as infrared wavelengths. The layers (30a, 30b, 30c, 30d) each have an optical thickness of approximately one-quarter wavelength at a reference wavelength of 1.6 microns. The refractive indices of the layers (30a, 30b, 30c, 30d) are stepped down from the surface (22), having values of approximately 3.2/2.6/1.9/1.45 respectively. The second layer (30b) is preferably formed of silicon suboxide ($SiO_{0<X<1}$) by electron-beam deposition of silicon in an oxygen backfill to obtain a refractive index between the indices of silicon and silicon monoxide. A thin passivation layer (26) of germanium or silicon nitride is formed on the surface (22) under the anti-reflection coating (30) to inhibit a flashing effect at infrared wavelengths after exposing to the ultraviolet (UV) and/or visible light.

24 Claims, 1 Drawing Sheet

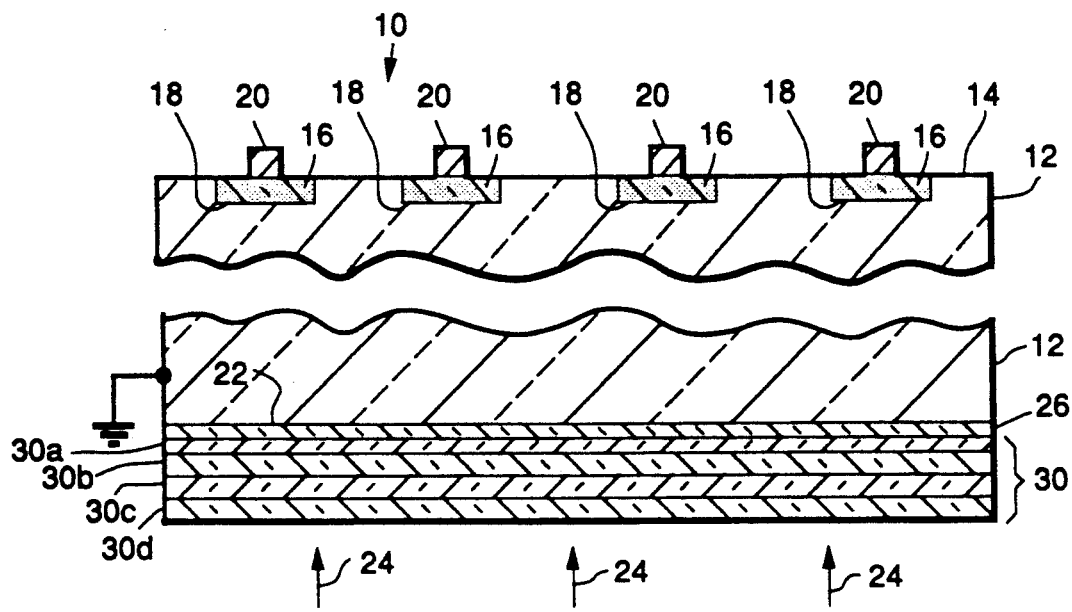
FIG. 1.
FIG. 2.
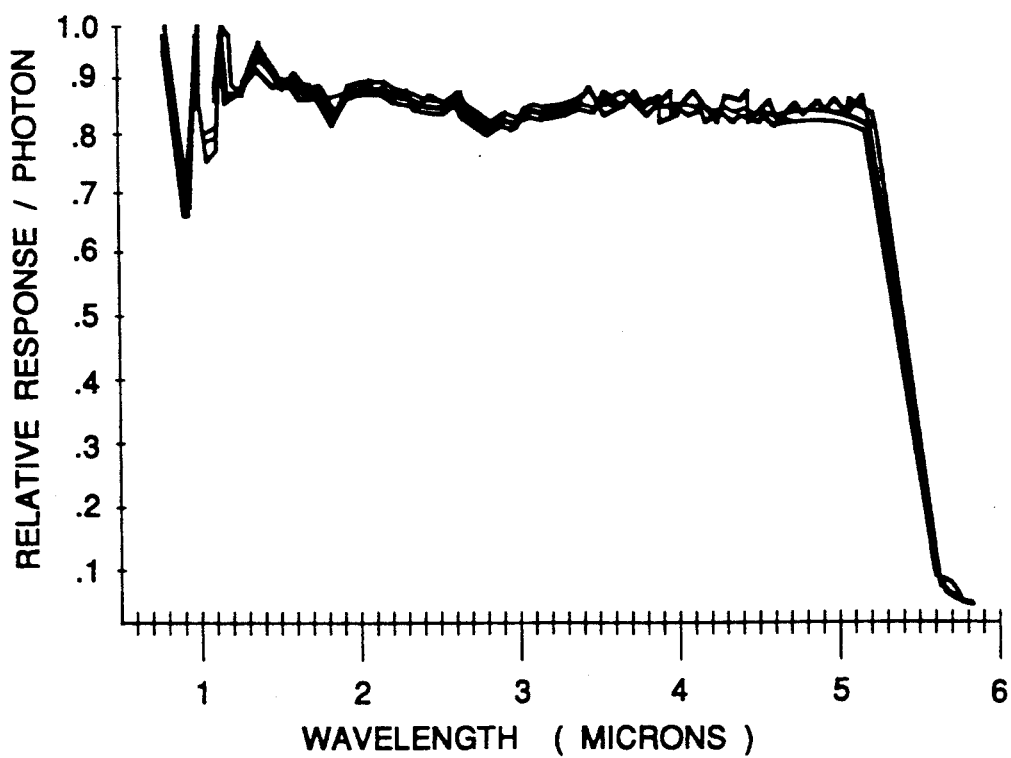

WIDEBAND ANTI-REFLECTION COATING FOR INDIUM ANTIMONIDE PHOTODETECTOR DEVICE AND METHOD OF FORMING THE SAME

BACKGROUND OF THE INVENTION

1. Field of the Invention

The present invention generally relates to the art of photodetectors, and more specifically to a wideband anti-reflection coating for an indium antimonide (InSb) photodetector which enables detection of light at visible as well as infrared wavelengths.

2. Description of the Related Art

Back-side illuminated InSb photodetector devices such as photodiode arrays are widely used for detecting infrared radiation at wavelengths between approximately 1 and 5.5 microns. InSb has a refractive index on the order of 4.0, and if no anti-reflection coating were provided, approximately 36% of incident light would be lost due to reflection from the light receiving surface. However, anti-reflection coatings are available which reduce the surface reflection to a level which enables practical use of the detectors at infrared wavelengths. A detailed treatise on conventional anti-reflection coatings is presented in a textbook entitled "THIN-FILM OPTICAL FILTERS", by H. Macleod, Adam Lilger, Ltd: London, 1969, pp. 37-72.

InSb devices are sensitive to visible light at wavelengths as short as approximately 0.4 microns as well as to infrared radiation. However, an anti-reflection coating which is effective over the extremely wide wavelength band from 0.4 microns to 5.5 microns has not been available, and this has limited the use of InSb photodetectors to applications for both the visible and infrared spectral regions.

SUMMARY OF THE INVENTION

The present invention provides a method of forming a wideband anti-reflection coating on a light-receiving surface of an indium antimonide (InSb) photodetector, and a photodetector device and coating fabricated by the method, which enable effective detection of visible and infrared radiation over a continuous wavelength range of approximately 0.4 to 5.5 microns.

The present coating includes four layers, each having an optical thickness of approximately one-quarter wavelength at a reference wavelength of 1.6 microns. The first to fourth layers are preferably formed of silicon (Si), silicon suboxide ($SiO_{0<X<1}$), silicon monoxide (SiO) and silicon dioxide ($SiO_2$), and have refractive indices which are stepped down from the surface at values of approximately 3.2/2.6/1.9/1.45 respectively.

The silicon suboxide layer is formed by electron-beam deposition of silicon in an oxygen backfill to attain a refractive index between the indices of silicon and silicon monoxide. The present method of forming a silicon suboxide layer can be applied to other anti-reflection coating applications.

A thin passivation layer, preferably of germanium or silicon nitride, is formed on the surface under the anti-reflection coating to inhibit a flashing effect at infrared wavelengths after exposing to the ultraviolet (UV) and/or visible light.

These and other features and advantages of the present invention will be apparent to those skilled in the art from the following detailed description, taken together with the accompanying drawings, in which like reference numerals refer to like parts.

DESCRIPTION OF THE DRAWINGS

FIG. 1 is a simplified sectional view of an indium antimonide (InSb) photodetector device including an anti-reflection coating embodying the present invention; and FIG. 2 is a graph illustrating the performance of the present anti-reflection coating.

DETAILED DESCRIPTION OF THE INVENTION

As illustrated in FIG. 1, an indium antimonide (InSb) photodetector device embodying the present invention is generally designated as 10, and includes an InSb wafer or substrate 12 having a front surface 14 in which at least one photosensitive semiconductor junction is formed. The substrate 12 is typically lightly doped with an N type dopant such as tellurium. Heavily doped P+ type regions 16 are formed in the surface 14 through ion implantation of beryllium. Photosensitive semiconductor junctions 18 which constitute photodiodes are formed at the interfaces of the P+ regions 16 and the N-type substrate 12. Ohmic contacts 20 are formed on the P+ regions 16. A complete circuit path for the photodiodes is provided by means which are symbolically indicated by connection of the substrate 12 to ground.

The substrate 12 has a back-side or light-receiving back surface 22 which is designed to receive incident light for detection by the device 10 as indicated by arrows 24. It will be noted, however, that the light receiving surface 22 may alternatively be the front-side surface 14 of the device 10. The substrate 12 is thin enough for the photo-generated carriers to diffuse therethrough from beneath the surface 22 to the junctions 18 and cause carrier collection at the junctions 18.

During the present fabrication process, the surface 22 is thoroughly cleaned, and a passivation layer 26, preferably of germanium (Ge) or silicon nitride ($S_3N_4$), is formed on the back surface 22 to inhibit a flashing effect at infrared wavelengths after exposing to the UV and/or visible light. The layer 26 is typically 50 Å to 150 Å thick, with the preferred thickness being 75 Å. The index of refraction of germanium is approximately 4.0, whereas the index of refraction of silicon nitride is approximately 2.05.

Alternative materials for the passivation layer 26 include silicon (Si), silicon monoxide (SiO), silicon dioxide ($SiO_2$), silicon suboxide ($SiO_{0<X<1}$), cadmium telluride (CdTe) and gallium arsenide (GaAs). The passivation layer 26 may also be embodied as a multilayer structure including sublayers of these materials in desired combinations.

In accordance with the present invention, a wideband anti-reflection coating 30 is formed over the passivation layer 26, including first to fourth substantially transparent layers 30a, 30b, 30c and 30d respectively. The indices of refraction of the layers 30a, 30b, 30c and 30d are progressively reduced or stepped down away from the surface 22.

Since the coating 30 must be relatively thick to cover such a wide wavelength band, a half-wave point, or wavelength at which the reflectance of the device 10 is equal to the reflectance of the uncoated surface 22, must be included in the design. The half-wave point was selected to be 0.8 microns, which lies in the atmospheric transmission gap between the visible and infrared spectral regions. The half-wave point is, however, variable from approximately 0.78 to 1.0 microns within the scope of the invention.

The design or reference wavelength $\lambda_0$ of the coating 30 is twice the half-wave wavelength, or 1.6 microns. The optical thickness of each layer 30a, 30b, 30c and 30d is approximately $\lambda_0/4$, and is equal to the physical thickness of the respective layer multiplied by its index of refraction. For $\lambda_0=1.6$ microns, the design optical thickness of each layer 30a, 30b, 30c and 30d is 4,000 Å. The coating 30 has four zeroes, or wavelengths at which the reflectance is zero, at $5\lambda_0/8$, $5\lambda_0/6$, $5\lambda_0/4$ and $5\lambda_0/2$, corresponding to wavelengths of 1, 1.33, 2 and 4 microns respectively.

The first layer 30a is preferably formed of silicon, and has a refractive index of 3.2. The preferred physical thickness of the layer 30a is 1,170 Å, corresponding to an optical thickness of 1,170 Å×3.2=3,744 Å. However, the layer 30a may alternatively be formed of germanium suboxide ($GeO_{0<X<1}$), (which can alternatively be written as $GeO_X$ where $0<X<1$), and/or have an index of refraction between approximately 3.2 and 3.3.

The second layer 30b is preferably formed of silicon suboxide, and has a refractive index of 2.6. The preferred physical thickness of the layer 30b is 1,300 Å, corresponding to an optical thickness of 1,300 Å×2.6=3,380 Å. However, the layer 30b may alternatively be formed of cadmium telluride, silicon carbide (SiC) or silicon nitride, and/or have an index of refraction between approximately 2.6 and 2.7.

The third layer 30c is preferably formed of silicon monoxide and has a refractive index of 1.9. The preferred physical thickness of the layer 30b is 2,000 Å, corresponding to an optical thickness of 2,000 Å×1.9=3,800 Å. However, the layer 30c may alternatively be formed of hafnium oxide ($HfO_2$), bismuth oxide ($Bi_2O_3$), zirconium oxide ($ZrO_2$), yttrium oxide ($Y_2O_3$) or cadmium telluride oxide ($CdTeO_3$), and/or have an index of refraction between approximately 1.9 and 2.0.

The fourth layer 30d is preferably formed of silicon dioxide and has a refractive index of 1.45. The preferred physical thickness of the layer 30b is 2,400 Å, corresponding to an optical thickness of 2,400 Å×1.45=3,480 Å. However, the layer 30d may alternatively be formed of magnesium fluoride ($MgF_2$) of calcium fluoride ($CaF_2$), and/or have an index of refraction between approximately 1.4 and 1.5.

It will be noted that the preferred optical thicknesses of the layers 30a, 30b, 30c and 30d are somewhat less than the theoretical design value of 4,000 Å, with the optical thickness of the second layer 30b (3,380 Å) having the largest deviation of 15.5% from the design value. This is because the preferred values were determined using a combination of theoretical calculation and experimentation with many practical factors and limitations taken into account and balanced against each other. It has been determined empirically that the thicknesses and indices of refraction of the layers 30a, 30b, 30c and 30d can deviate from the design values by as much as 20%, and the coating 30 will still produce a satisfactory wideband anti-reflecting effect. As used herein, a wavelength of "approximately $\lambda_0/4$" includes deviations of the exact value of $\lambda_0/4$ of up to about 20%.

In accordance with a method embodying the present invention, the coating 30 is formed on the layer 26 by an electron-beam thin-film deposition or evaporation technique such as described in a textbook entitled "HANDBOOK OF THIN FILM TECHNOLOGY", by L. Maissel et al, McGraw-Hill, 1970, pp. 1–50 to 1–54. The deposition apparatus for forming the coating 30 is conventional, and is not illustrated or described in detail.

The coating 30 is formed by placing the substrate 12 in an evacuated chamber. The first layer 30a (silicon) is formed by bombarding a mass or source of silicon with an electron beam. The bombardment heats the source to produce silicon vapor which is allowed to contact the substrate 12 for a length of time sufficient to form the layer 30a to the desired thickness.

The second layer 30b (silicon suboxide) is formed by electron bombardment of the silicon source in a manner similar to the first layer 30a. However, the chamber is backfilled with oxygen at a pressure of approximately $10^{-4}$ Torr. This causes the second layer 30b to have the composition $SiO_X$, where $0<X<1$. The refractive index (2.6–2.7) of the second layer 30b is between the indices of bulk silicon (3.4) and silicon monoxide (1.9).

The third layer 30c (silicon monoxide) is deposited by heating a silicon monoxide source in a vacuum using an electrical resistance heater to produce silicon monoxide vapor. The fourth layer 30d is formed in a manner similar to the third layer 30c, except that an oxygen backfill and plasma are provided to produce silicon dioxide vapor.

The first, third and fourth layers 30a, 30c and 30d respectively are formed using conventional deposition or evaporation technology. However, the second layer 30b (silicon suboxide) is uniquely formed in accordance with the present method, and can be used in anti-reflection coating designs other than the particular wideband coating 30 as described and illustrated.

EXAMPLE

A photodetector device 10 as illustrated in FIG. 1 was fabricated using the present method to the preferred specifications described above as summarized in the following table:

TABLE

| LAYER | MATERIAL | INDEX OF REFRACTION | PHYSICAL THICKNESS |
|---|---|---|---|
| 26 | Germanium or Silicon nitride | 4.0 2.05 | 75Å |
| 30a | Silicon | 3.2 | 1,170Å |
| 30b | Silicon suboxide | 2.6 | 1,300Å |
| 30c | Silicon monoxide | 1.9 | 2,000Å |
| 30d | Silicon dioxide | 1.45 | 2,400Å |

FIG. 2 illustrates the performance of the present photodetector 10 as operated at a temperature of 78K. It will be seen that the photodetector 10 produces usable relative response per photon of incident radiation within the wavelength range of 0.4 to 5.5 microns.

While several illustrative embodiments of the invention have been shown and described, numerous variations and alternate embodiments will occur to those skilled in the art, without departing from the spirit and scope of the invention. Accordingly, it is intended that the present invention not be limited solely to the specifically described illustrative embodiments. Various modifications are contemplated and can be made without departing from the spirit and scope of the invention as defined by the appended claims.

We claim:

1. An anti-reflection coating for a light-receiving surface of a photodetector device, comprising:
   a first substantially transparent layer which is formed over said surface and has an optical thickness of approximately $\lambda_0/4$, where $\lambda_0$ is a predetermined reference wavelength, and an index of refraction between approximately 3.2 and 3.3;
   a second substantially transparent layer which is formed over the first layer and has an optical thickness of approximately $\lambda_0/4$, and an index of refraction between approximately 2.6 and 2.7;
   a third substantially transparent layer which is formed over the second layer and has an optical thickness of approximately $\lambda_0/4$ and an index of refraction between approximately 1.9 and 2.0; and
   a fourth substantially transparent layer which is formed over the third layer and has an optical thickness of approximately $\lambda_0/4$ and an index of refraction between approximately 1.4 and 1.5.

2. A coating as in claim 1, in which the first layer comprises a material selected from the group consisting of silicon (Si) and germanium (Ge).

3. A coating as in claim 1, in which the first layer comprises silicon (Si) and has a physical thickness of approximately 1,170 Å.

4. A coating as in claim 1, in which the second layer comprises a material selected from the group consisting of silicon suboxide ($SiO_{0<X<1}$), cadmium telluride (CdTe), silicon carbide (SiC) and silicon nitride ($Si_3N_4$).

5. A coating as in claim 1, in which the second layer comprises silicon suboxide ($SiO_{0<X<1}$) and has a physical thickness of approximately 1,300 Å.

6. A coating as in claim 1, in which the third layer comprises a material selected from the group consisting of silicon monoxide (SiO), hafnium oxide ($HfO_2$), bismuth oxide ($Bi_2O_3$), zirconium oxide ($ZrO_2$), yttrium oxide ($Y_2O_3$) and cadmium telluride oxide ($CdTeO_3$).

7. A coating as in claim 1, in which the third layer comprises silicon monoxide (SiO) and has a physical thickness of approximately 2,000 Å.

8. A coating as in claim 1, in which the fourth layer comprises a material selected from the group consisting of silicon dioxide ($SiO_2$), magnesium fluoride ($MgF_2$) and calcium fluoride ($CaF_2$).

9. A coating as in claim 1, in which the fourth layer comprises silicon dioxide ($SiO_2$) and has a physical thickness of approximately 2,400 Å.

10. A coating as in claim 1, further comprising a passivation layer formed on said surface underlying the first layer, the passivation layer comprising a material selected from the group consisting of silicon (Si), silicon monoxide (SiO), silicon dioxide ($SiO_2$), silicon suboxide ($SiO_{0<X<1}$), silicon nitride ($Si_3N_4$), germanium (Ge), cadmium telluride (CdTe) and gallium arsenide (GaAs).

11. A coating as in claim 1, in which the passivation layer comprises germanium and has a physical thickness between approximately 50 Å and 150 Å.

12. A coating as in claim 1, in which $\lambda_0$ is approximately 1.6 microns.

13. A photodetector device, comprising:
   an indium antimonide (InSb) photodetector having a light-receiving surface; and
   an anti-reflection coating which is formed on said surface and includes:
   a first substantially transparent layer which is formed over said surface and has an optical thickness of approximately $\lambda_0/4$, where $\lambda_0$ is a predetermined reference wavelength, and an index of refraction between approximately 3.2 and 3.3;
   a second substantially transparent layer which is formed over the first layer and has an optical thickness of approximately $\lambda_0/4$, and an index of refraction between approximately 2.6 and 2.7;
   a third substantially transparent layer which is formed over the second layer and has an optical thickness of approximately $\lambda_0/4$ and an index of refraction between approximately 1.9 and 2.0; and
   a fourth substantially transparent layer which is formed over the third layer and has an optical thickness of approximately $\lambda_0/4$ and an index of refraction between approximately 1.4 and 1.5.

14. A device as in claim 13, in which the first layer comprises a material selected from the group consisting of silicon (Si) and germanium (Ge).

15. A device as in claim 13 in which the first layer comprises silicon (Si) and has a physical thickness of approximately 1,170 Å.

16. A device as in claim 13, in which the second layer comprises a material selected from the group consisting of silicon suboxide ($SiO_{0<X<1}$), cadmium telluride (CdTe), silicon carbide (SiC) and silicon nitride ($Si_3N_4$).

17. A device as in claim 13, in which the second layer comprises silicon suboxide ($SiO_{0<X<1}$) and has a physical thickness of approximately 1,300 Å.

18. A device as in claim 13, in which the third layer comprises a material selected from the group consisting of silicon monoxide (SiO), hafnium oxide ($HfO_2$), bismuth oxide ($Bi_2O_3$), zirconium oxide ($ZrO_2$), yttrium oxide ($Y_2O_3$) and cadmium telluride oxide ($CdTeO_3$).

19. A device as in claim 13, in which the third layer comprises silicon monoxide (SiO) and has a physical thickness of approximately 2,000 Å.

20. A device as in claim 13, in which the fourth layer comprises a material selected from the group consisting of silicon dioxide ($SiO_2$), magnesium fluoride ($MgF_2$) and calcium fluoride ($CaF_2$).

21. A device as in claim 13, in which the fourth layer comprises silicon dioxide ($SiO_2$) and has a physical thickness of approximately 2,400 Å.

22. A device as in claim 13, further comprising a passivation layer formed on said surface underlying the first layer, the passivation layer comprising a material selected from the group consisting of silicon (Si), silicon monoxide (SiO), silicon dioxide ($SiO_2$), silicon suboxide ($SiO_{0<X<1}$), silicon nitride ($Si_3N_4$), germanium (Ge), cadmium telluride (CdTe) and gallium arsenide (GaAs).

23. A device as in claim 22, in which the passivation layer has a physical thickness between approximately 50 Å and 150 Å.

24. A coating as in claim 13, in which $\lambda_0$ is approximately 1.6 microns.

* * * * *